Nov. 11, 1969   D. W. GARNETT   3,477,530
CONTAINER SUPPLY MECHANISM FOR WEIGHING APPARATUS
Original Filed Nov. 6, 1964   6 Sheets-Sheet 2

INVENTOR.
DONALD W. GARNETT
BY
ATTORNEYS

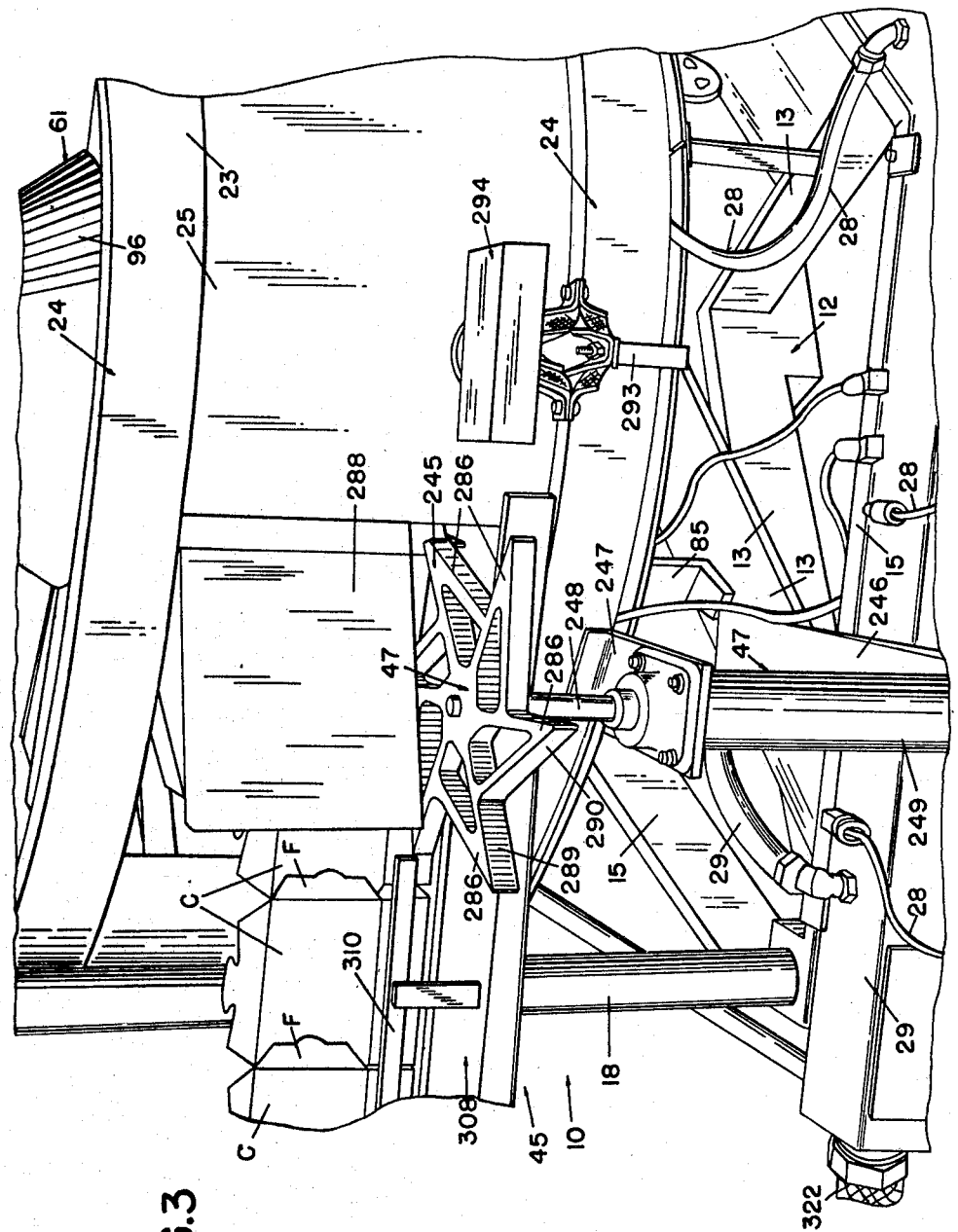

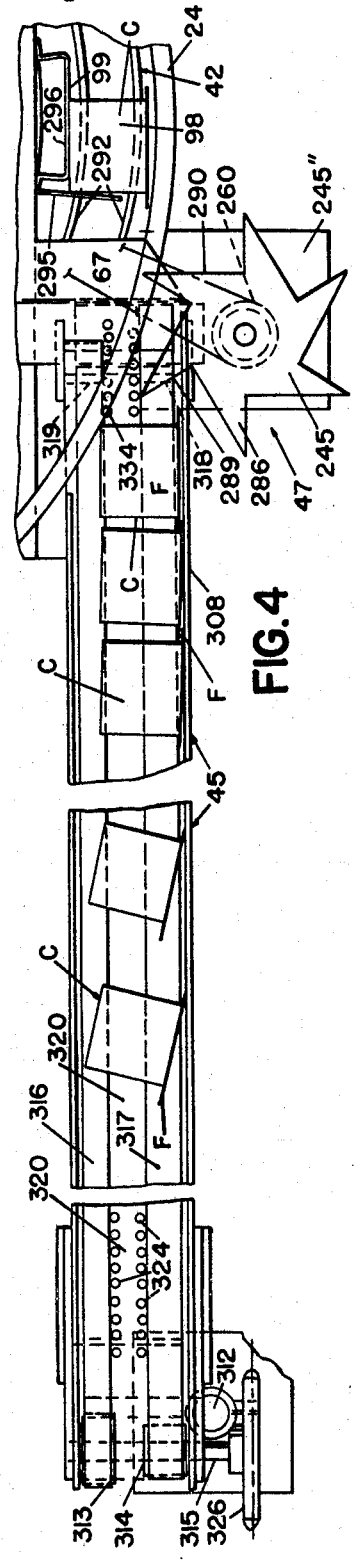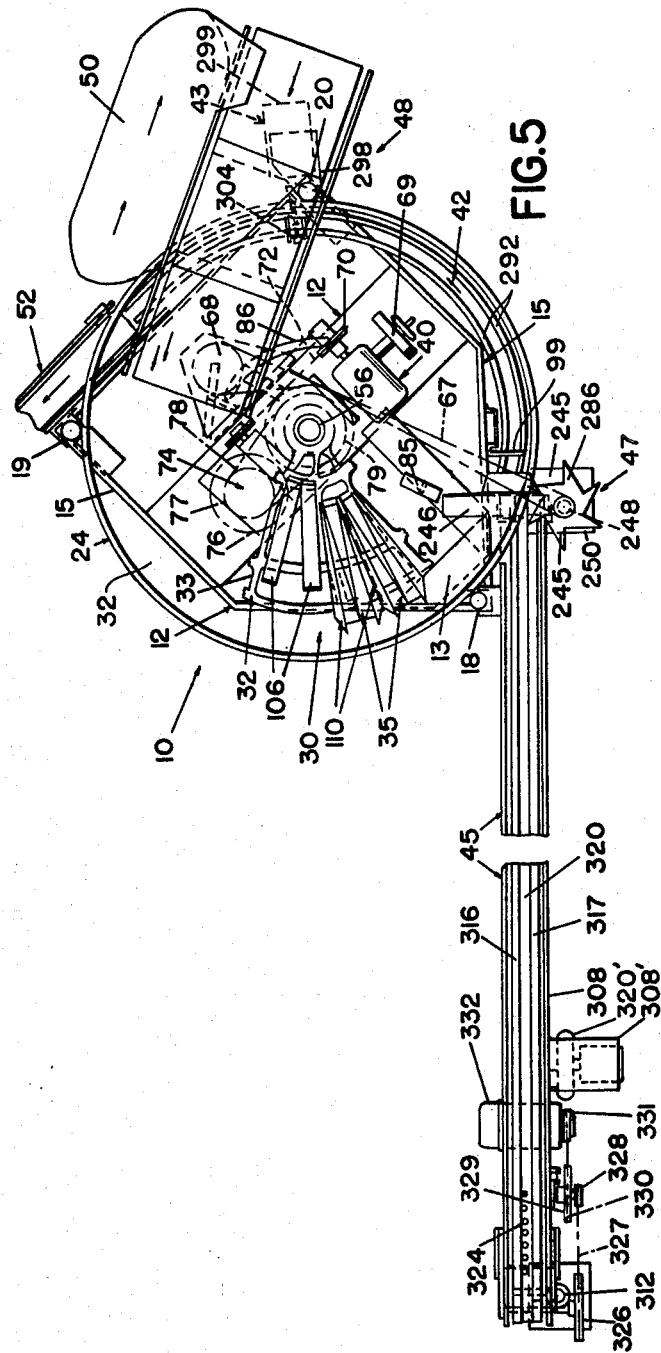

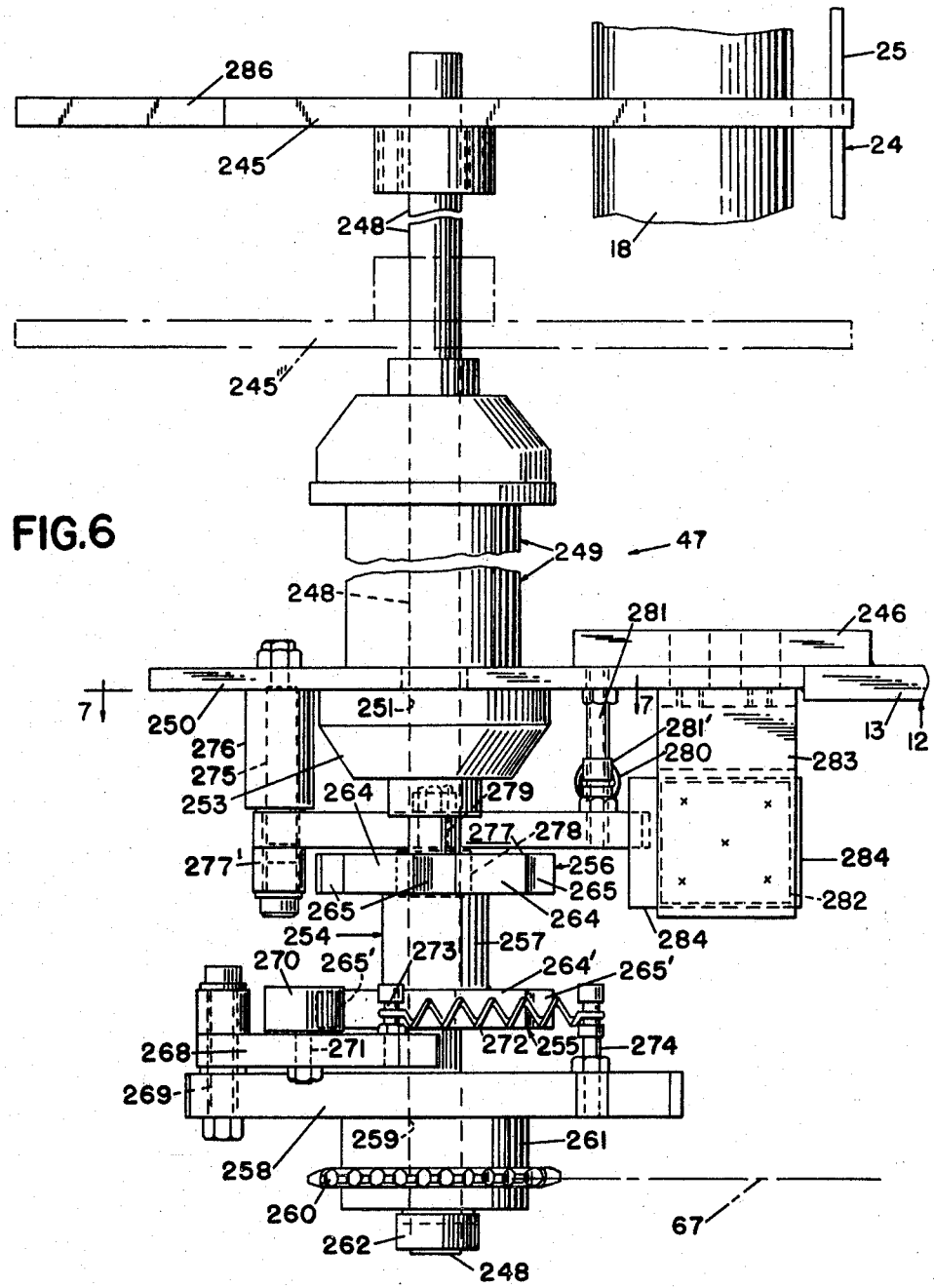

Nov. 11, 1969 D. W. GARNETT 3,477,530
CONTAINER SUPPLY MECHANISM FOR WEIGHING APPARATUS
Original Filed Nov. 6, 1964 6 Sheets-Sheet 6

INVENTOR.
DONALD W. GARNETT
BY
ATTORNEYS

United States Patent Office 3,477,530
Patented Nov. 11, 1969

3,477,530
CONTAINER SUPPLY MECHANISM FOR WEIGHING APPARATUS
Donald W. Garnett, Grand Ledge, Mich., assignor to The Olofsson Corporation, Lansing, Mich., a corporation of Michigan
Original application Nov. 6, 1964, Ser. No. 409,543. Divided and this application Aug. 31, 1967, Ser. No. 664,815
Int. Cl. G01g 13/24
U.S. Cl. 177—55                                   8 Claims

ABSTRACT OF THE DISCLOSURE

A mechanism is shown for supplying set-up or erected cartons or like containers to a high speed rotary weighing machine, the supply being under the control of the weighing machine and in such a way that, when the weigher detects an inacceptable overweight or an underweight of product to be packaged in the cartons, it will originate and forward a reject signal to control apparatus of the mechanism. The control means responds to this signal with the result that a carton which would otherwise receive the inacceptable charge of product is halted in a normal feed-in movement, as part of a series of cartons, to the weigher. This, in turn, results in the overweight or underweight charge being dumped from a weighing receptacle to a disposal point without being packaged, the halting of a carton having occasioned an absence of a carton at the product dump zone.

---

The present application is a division of my copending application, Ser. No. 409,543, filed Nov. 6, 1964, and entitled: Weighing Apparatus.

The improved carton supply equipment essentially comprises a star wheel whose operating or control means responds to a reject signal. The star wheel is braked and consequently blocks the advance of an end-to-end series of cartons or like containers, a normal rotation of the star wheel resuming when a reject signal is not initiated in the weigher.

Set-up cartons are forwarded to the star wheel through the agency of an improved double-belt type, vacuum-augmented conveyor, including belts driven at different linear speeds for the purpose of skewing the containers into a uniform, linearly aligned and end-to-end series. The belts operate over the horizontal surface of a vacuum manifold, the surface is apertured to enable the vacuum to draw the cartons down snugly onto the belts for their advance to the weigher and its star wheel control.

BACKGROUND OF THE INVENTION

Field of the invention

The invention is, as indicated above, applicable specifically to the field of high speed rotary weighing machines, in which it is desired in response to a reject signal, to prevent the discharge to a package, carton or other container of an inacceptable overweight or underweight charge. However, the improved container supply mechanism is also capable of broader utilization in any field in which an interruptedly controlled supply of a series of cartons, or like objects, to a continuously operating mechanism of one sort or another is desired.

Description of the prior art

The most pertinent prior art reference of which I am aware is the patent to Olofsson and Garnett, No. 3,156,- 311 of Nov. 10, 1964, entitled: "Weighing Machine"; this patent and the present application have common ownership. In the equipment of the Olofsson et al. patent set-up cartons are advanced by a horizontal conveyor in spaced relation to one another; and in the event of an inacceptable overweight or underweight, a reject signal initiated by the weigher is used to interrupt momentarily the operation of a carton set-up machine which supplies the cartons to the conveyor.

SUMMARY OF THE INVENTION

The equipment of the invention essentially comprises two units or sub-combinations. One of these is an improved dual-belt type horizontal conveyor, whose upper belt reaches, as driven at different linear speeds, are effective to swing erected cartons to a linearly aligned series in end-to-end contact with one another, and with certain flaps of the cartons overlapped relative to one another. The belt reaches travel the top of an apertured vacuum manifold, by which vacuum is made effective on the cartons to hold the latter down unto the belt reaches as the latter manipulate the cartons in the manner referred to.

The second basic unit or sub-assembly of the equipment is a rotatively operated star wheel, whose action, in response to a reject signal from the weigher, is to momentarily interrupt the flow of cartons into the weigher, so that no carton will be present at the discharge point of a weigher receptacle to receive the inacceptable weight. The star wheel rotates on an upright axis at the point where the carton series normally passes into the rotative path of travel of the weighing receptacles. At this point they are picked up by pushers, one for each receptacle, travelling with the latter. Upon interruption of carton advance, the two belts of the supply conveyor pass uninterruptedly beneath the halted carton series.

BRIEF DESCRIPTION OF THE DRAWINGS

FIG. 3 is a fragmentary view, in larger scale than FIGS. 1 and 2, illustrating the star wheel carton feed control mechanism of the invention, as operated in conjunction with the weighing apparatus, to govern the interruption of set-up cartons into the latter, as in response to overweight or underweight signals from the weigher;

FIG. 4 is a fragmentary top plan view, partially broken away, illustrating basic components of the carton supply and material weighing equipment;

FIG. 5 is a broken top plan view illustrating the general arrangement of rotary and vibratory weighing pan devices of the weigher in relation to the carton supply structure;

FIG. 6 is a fragmentary elevational view showing the star wheel carton control unit referred to.

DESCRIPTION OF A PREFERRED EMBODIMENT

Figure 1:
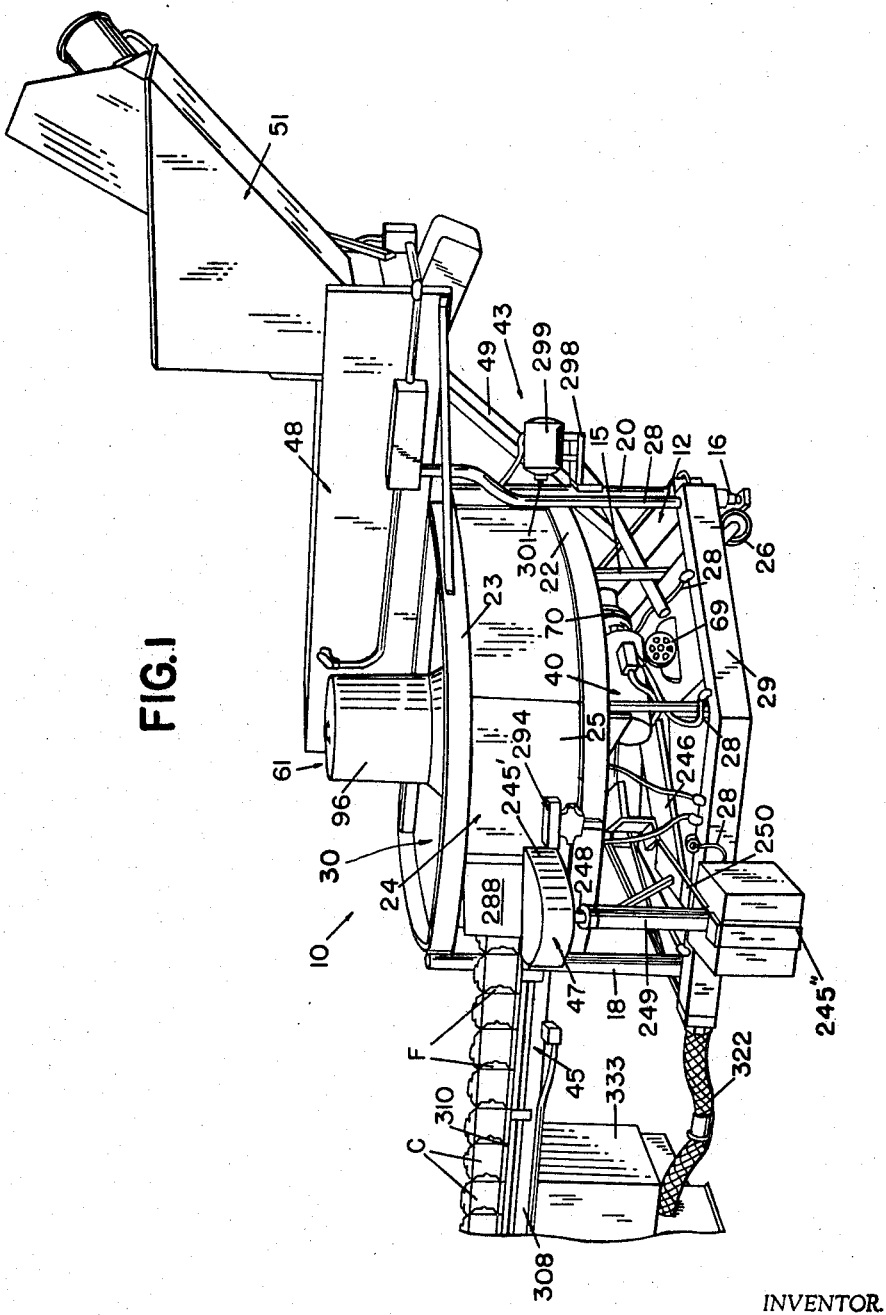
FIGS. 1 and 2 are fragmentary perspective views illustrating the general organization of the weighing equipment into which cartons are supplied by the equipment of the invention; these views also showing certain associated material supply and return elevator units.

The operating instrumentalities of the weighing apparatus (designated in its entirety by the reference numeral 10) to which the improved feed mechanism is applied, are mounted upon a welded-steel base frame structure 12, which comprises an arrangement of horizontal steel channel and associated rigid frame members 13 surrounded by and welded at their ends to a surrounding polygonal welded bottom girdle 15. To such a frame structure 12 a number of vertically adjustable floor legs 16 (FIG. 1) are welded at appropriate points to support the operating parts of the equipment with a balanced distribution of the latter's weight.

At certain of the corners thereof, the polygonal girdle 15 of the frame structure has vertically elongated posts 18, 19, 20 rigidly secured thereto (FIG. 5); and these posts in turn have welded or otherwise rigidly secured thereto a pair of vertically spaced, parallel and coaxial steel rings 22, 23 of an open-topped cylindrical weigher housing, generally designated 24, the sheet metal wall 25 of which is rigidly secured at its bottom and top, respectively, to the inner side of rings 22, 23.

The frame structure 12 may be provided with a number of casters 26 (FIG. 1) which, upon an adjustment to shorten the height of the length of the floor legs 16, will afford a mobile mount for the apparatus. The posts 18, 19, 20 and the frame structure 12 as a whole, rigidly support certain further mounting bracket means for operating components of the weighing equipment. Needed service provisions in the form of electrical connectors 28, shown as communicating with a wiring manifold or conduit 29, are also supported by frame 12 and housing 25, such provisions not being particularly germane to the invention.

Figure 2:
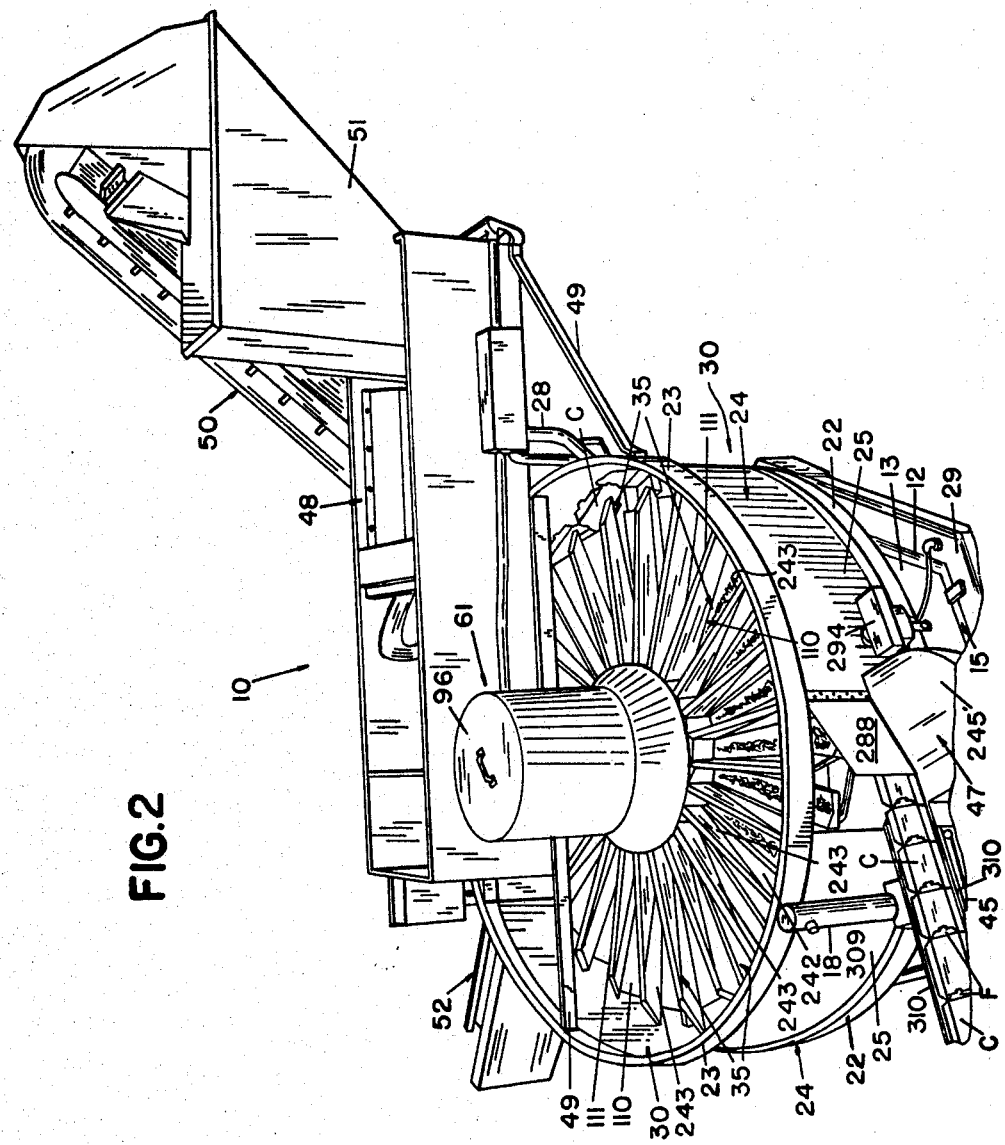

The rotary weighing apparatus 30 proper of the equipment 10 generally comprise, as best shown in FIGS. 2 and 5 a horizontal table 32 of circular outline, which may be a skeleton-like casting having a number of radially outwardly extending spokes 33 in equal circumferential spacing to one another, being reinforced by concentric rings to sustain a suitable number of individual, equally spaced and outwardly radiating vibratory weighing units, each generally designated by the reference numeral 35.

The supporting frame structure 12 mounts, directly beneath the rotary table 32, certain zeroing high goal and low goal weight units, a main electrical drive motor 40, and reduction gear operating chain and belt means, etc., as described in the case identified above. The frame structure 12 also sustains various other components of the weigher 30, including an arcuate carton supporting and guiding rail structure 42 (FIGS. 4 and 5) and a motor driven unit 43 for vibrating the latter to assist in settling the contents discharged to cartons C guided from rail structure 42.

The carton feed or supply mechanism of the invention is generally designated by the reference numeral 45, the action of which, as indicated above, is to interrupt the feed of cartons C for the reception of a weighed charge in the event that the latter is signaled to be overweight or underweight.

A still further supply component coacting with the weigher 30 proper as actually operated (FIGS. 1 and 2) is a three-stage material supply unit 48, appropriately supported by bracket means 49 on top of the fixed wall structure 24, as shown and illustrated and described in the Olofsson et al. patent identified above. Mechanism 48 is in turn supplied with material to be weighed, for re-distribution to the weighing units, by a return material feed elevator 50 delivering upwardly to a hopper 51 (FIG. 2) of supply unit 48, also as illustrated and described in that patent. These units 48 and 50 are service components necessary to the operation of the weighing equipment, as is also a certain filled carton discharge unit or mechanism 52, but none of these last named three units constitute part of the present invention.

A rotative column or like member (not shown) is powered from the drive of the weigher 10, as by one reach of a horizontal chain belt 67 for the drive of a star member 47 of the star wheel unit 45, indicated in FIGS. 5 and 6. The main drive motor 40 has hand operated means 69 (FIG. 1) of a conventional sort for an adjustment to control belt tension.

As shown in FIGS. 1 and 5, drive motor 40 has a pulley 70 about which pulley a V-belt 72 extends. The belt 72 is trained about a pulley (74) of a reduction gear device (74) for motor 40; and a vertical output shaft of this reduction unit has a pair of larger and smaller diameter, lower and upper sprockets 76, 77, respectively, affixed thereto. A horizontal chain belt 78 is adapted to drivingly connect one of these (shown as the smaller diameter sprocket 77) with an upper sprocket 79 fixed on an upright tubular column 56 which in effect represents the driveshaft for the rotary table of the machine.

Thus, employing flexible belt and chain driving arrangements as shown in FIGS. 4 and 5, the main drive motor 40 provides a selective speed drive for rotary weigher table 32, and also a synchronized, selective speed chain drive for the star wheel unit 47, as will be described.

A commutation unit 61 encased in a protective cover 96 is disposed coaxially above the rotary drive column 56 including various slip ring, commutator ring, and brush components governing the timing of the weighing apparatus, is illustrated in the parent application identified above.

Weighed material in excess of the exact desired weight which is discharged by weighing units 35 in the dribble feed-off phase of the weighing cycle, as well as full charges of material determined to be underweight or duly overweight during the check weigh phase, and for which a box is accordingly prevented from being fed to the weighing unit by the star wheel control unit 47, is continuously led out of a receiver therefor by the return elevator or conveyor 50. This elevator returns all the excess material to the staged supply unit 48, for re-feed to the traveling weighing units 35, along with new make-up material to be weighed. Each unit 35 has a vibrating device 106 (FIG. 5).

Structural features of the weighing units 35, of which there are twenty-four mounted to extend radially upon the spoke table 32, constitute no part of the present application, but are fully illustrated and described in my application, Ser. No. 409,503, identified above. In general each unit 35 comprises a material receiving receptacle 110 in the form of an elongated horizontal sheet metal pan or tray having an upper, outwardly projecting side flange 111 on a side wall which slightly overlaps laterally over the adjacent side wall of the next receptacle, as indicated in FIG. 2, so that the annular array of weighing receptacles, trays or pans 110 will intercept all of the material to be weighed which is gravitationally supplied thereto from above by the staged vibratory supply unit 48, as they travel beneath the latter. As indicated in FIG. 2, each pan is formed to provide a bottom part 242, from which side walls 243 diverge upwardly, the overlap of successive pans 110 being at the top of the walls.

STAR WHEEL CARTON CONTROL MECHANISM

The container feed controlling star wheel mechanism 47 proper includes a top star wheel member 245 normally enclosed in a fixed upper housing 245', and component brake and clutch control provisions thereof, enclosed in a lower fixed housing 245", as shown in FIG. 1. Unit 47 is mounted basically by a horizontal bracket extension 246 supported adjacent the goal unit mounting bracket 85 by member 13 of the frame structure 12 of the machine. A bracket 247 (FIG. 3) beneath housing 245' also serves to rigidly connect the unit to the ring 22 of mechanism 30.

Figure 7:
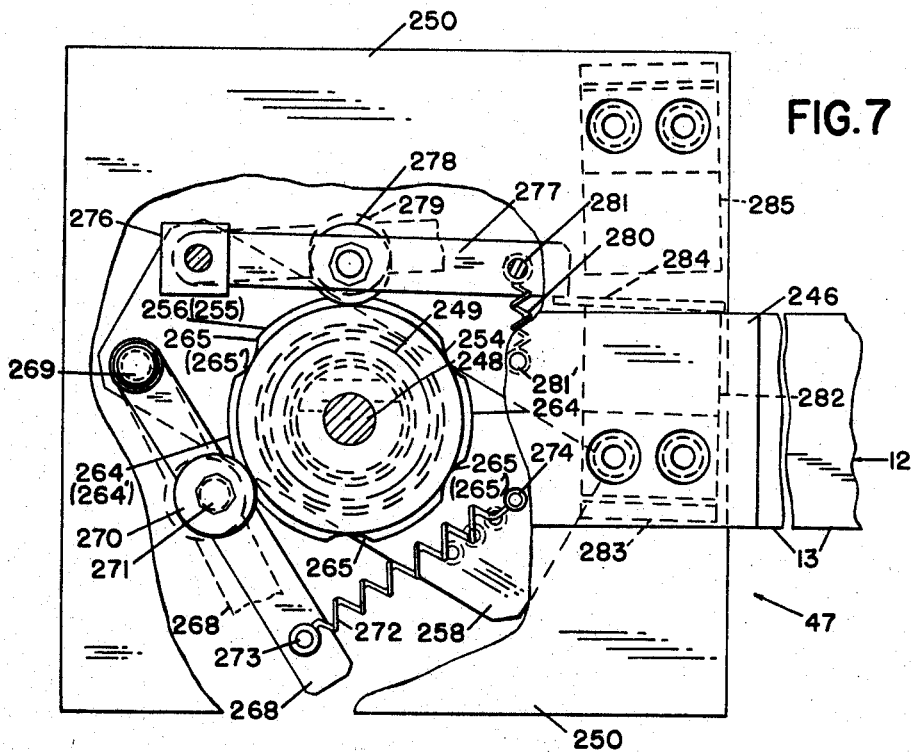
FIG. 7 is a top plan view, partially broken away and in section along line 7—7 of FIG. 6, further illustrating the construction of the star wheel control unit.

As appears in FIGS. 6 and 7, the star wheel 245 is centrally secured to the top of an upright drive shaft 248, which shaft journals in a vertically elongated bearing unit 249; and the bearing unit 249 is directly mounted to a horizontal rectangular support plate 250 secured to the bracket extension 246, the plate having a hole 251 through which the shaft 248 extends.

FIG. 6 illustrates in dot-dash outline an optional additional star wheel 245''' on its shaft for installations in which cartons of considerable depth are handled.

Beneath a lower bearing member 253 of the bearing unit 249 for the star wheel shaft 248, the latter has fixedly mounted thereon a combined clutch and brake device, generally designated 254, which includes a lower cam-like clutch disc or member 255, a like upper brake disc or member 256, and a hub 257 coaxially connecting these members rigidly to one another, the hub being sleeved on star wheel shaft 248 and in turn fixedly connected in driving relation to the latter.

Somewhat beneath the clutch disc 255 a rather large horizontal driving plate 258 of rectangular outline is provided, this plate having a central hole 259 through which the shaft 248 vertically extends, thus mounting the drive plate 258 in relatively rotative relation to the shaft. A sprocket 260 has an enlarged hub 261 similarly surrounding the shaft 248 and concentrically welded to the bottom side of drive plate 258; and a retainer collar 262 fixed on the bottom of shaft 248 sustains the drive plate and sprocket 260 from beneath. Sprocket 260 is driven, as indicated above, by the chain belt 67 from the sprocket 66 of the weigher apparatus 30 proper.

The respective clutch and brake discs 255, 256 of the device 254 are identical in their generally circular outline. The upper brake disc 255 has its arcuate outer periphery at 264 interrupted by six arcuately concave recesses or notches 265 in equal circumferential spacing to one another. Corresponding formations on the lower clutch disc 255 are designated by corresponding reference numerals, primed, and as is indicated in FIGS. 6 and 7, the two members 255, 256 are in angular register with one another, the recesses or notches 265 of the upper brake member 265 being vertically aligned with the recesses or notches 265' of the lower clutch member.

A driving clutch arm 268 is pivotally mounted on the clutch drive plate 258 by means of an upright pin 269 adjacent a corner of the latter, and the arm 268 is provided with a follower-type of disc drive roller 270, which is pivoted on an upright axis medially of the length of the arm by means of a further pin 271. Roller 270 is urged into engagement with the clutch disc 255 by means of a medium tension coil spring 272 acting between upright anchor pins 273 and 274, the former carried at the free end of arm 268 and the latter fixed on the drive plate 258.

Accordingly, upon rotation of the star wheel shaft 248 by sprocket 260 the clutch driving roller 270 is resiliently urged against the periphery of clutch disc member 255 under the bias of the medium tension spring 272, which exerts a force sufficient, when roller 270 engages in a disc recess 265', to normally rotate the clutch disc and the shaft 248 to which it is secured, for the continuous rotation of the star wheel 247 atop the shaft. However, this rotation is adapted to be halted in response to an overweight or underweight check weigh signal originated in the sensing system of the weigher (as described in the parent application) by means of the braking provisions of the star wheel unit 47.

To this end, the horizontal mounting plate 250 is provided with a depending pin 275 extending through a spacing collar 276, the pin serving as a pivot for a horizontally extending brake arm 277, which is supported on the pin 275 from beneath by means of a spacer 277' sustained by the pivot pin. Medially of the length thereof, the brake arm 277 has a follower-like brake roller 278 journaled thereon by an upright pin 279, and a light tension coil spring 280 (FIG. 7) acts between an upright anchor pin 281 adjacent the end of the arm and a fixed anchor pin 281' depending from the support plate 250. The tension of spring 280, as compared with spring 272, is sufficient only to initiate movement (clockwise about pivot pin 275, as viewed in FIG. 7) of the brake arm 277 toward the brake disc 256 when an overweight or underweight reject signal is originated. Full braking force is exerted in a way to be described.

A reject signal originated at the overweight-underweight contacts of the weigher's circuit has the effect of energizing a braking electromagnet 282 fixedly carried in depending relation to the mounting plate 250, as by means of a sub-bracket 283. Brake arm 277 is provided at its free end with an outwardly extending armature piece 284 which, upon energization of electromagnet 282, is drawn toward the latter, swinging the brake arm roller 278 into engagement with a notch or recess 265 in the cam-like brake disc member 256.

This action is performed under strong electromagnetic attraction to hold brake roller 278 in a brake disc recess, with the result that rotation of disc 256, the shaft 248 and star wheel 245 are instantaneously halted and held halted so long as the reject signal is applied to electromagnet 282. As indicated above, it is the sole function of the light tension spring 280 to start movement of the brake arm 277 toward disc 256, and away from a holding electromagnet 285.

Inasmuch as the brake roller 278 would normally ride the periphery of the brake disc 256 while electromagnet 282 remains de-energized, clicking into and out of brake recesses 265 with undesirable noise and wear, the control structure for the star wheel 245 includes a second or holding electromagnet 285 (FIG. 7) fixedly depending from mounting plate 250 in laterally spaced relation to magnet 282. Electromagnet 285 becomes energized when the electromagnet 282 is de-energized, thereby attracting brake arm armature 284 and holding the brake roller 278 away from the rotating brake disc member 256, as indicated in dotted line in FIG. 7.

The clutch arm's roller 270 will, as indicated above, have driving engagement in a recess 265 of clutch disc 255 under the bias of spring 272 in the normal operation of star wheel unit 47, but in the brief interval when the brake is applied the spring 272 will permit roller 270 to ride outwardly to the dotted line position of FIG. 7 as the brake roller 278 goes to its braking position, shown in solid line in FIG. 7; and the star wheel 245 remains halted despite the fact that the drive of its sprocket 260 continues.

As best shown in FIGS. 3 and 5, the star wheel 245 has six equally spaced radiating points 286 which operate (FIG. 6) in the horizontal plane of travel of cartons C delivered thereto by the carton supply unit 45. This takes place in a zone at which the carton guide structure 42 commences and at which the cylindrical upright member 25 of the fixed confining wall 24 of the weighing mechanism 30 is provided with an outwardly flared extension 288 of the wall member 25, by which the cartons C are partially guided into the weigher.

Each of the star wheel points 286 coacts with a succeeding one in providing a carton stop wall or face 289 (FIG. 3) against which a carton comes to a halt upon a reject signal, and a substantially 90° pusher face 290, which assists in continuing movement of the carton into the weigher in the absence of a reject signal.

CARTON GUIDE AND PUSHER STRUCTURE

Referring to FIGS. 1, 4 and 5, the arcuate carton guide structure 42 comprises a pair of radially spaced, concentrically arcuate carton supporting rails 292, which are fixedly but resiliently mounted adjacent the top of a receiving space radially outwardly of the weigher, at one of the arcuate ends of the receiving space and near star wheel unit 47. This mount may be accomplished by means including an upright bracket arm 293 secured to the bottom wall ring 22, and a resiliently cushioned block device 294. The rails 292 extend, in the circumferential direction, from the zone of entry of set-up cartons C past guide plate 288 into the weigher 30 to a zone adjacent their point of discharge. Intermediate their length, the motor operated vibratory unit 43 acts from beneath on the carton rails 292 to vibrate the same and compact the weighted content in the cartons C prior to discharge; and the rails have further intermediate frame support by a cushioned mount similar to that at 294.

The rotary spoke wheel 32 has fixedly mounted thereon, in equally closely spaced relation about its periphery, a succession of carton pushers 99 (FIG. 5) which are in a horizontal plane directly above the carton rails 292. These pushers are individually located directly beneath the outer ends of the vibratory pans 110, respectively, so that cartons C pushed thereby are accurately positioned to receive charges of material weighed and found to be within permissible weight limits. The shape of the pushers 99 is of no particular significance, so long as the pusher affords a rear pusher part and a part serving to limit radial motion of the carton C and maintain the same properly above the rails 292. No attempt has been made to illustrate the exact spacings of the pushers 99.

The rail vibrating unit 43 is best illustrated in FIGS. 1 and 5. Although its details constitute no part of the invention, it is typically shown as being fixedly supported on the upright frame post 20, intermediate the arcuate extent of rails 292. This may be done by means providing a fixed table 298 upon which an electric motor 299 is fixedly mounted, being appropriately powered for continuous operation during the operation of the weigher. An output shaft (301) of motor 299 extends via appropriate flexible drive coupling means (301) through the fixed cylindrical wall 24 of the machine and into a frame (303) on which the rails 292 are secured from above.

Eccentric weights 304 are fixedly carried on the motor shaft (301) within the confines of the frame 303, out of position for interference with the rails 292, and upon operation of motor 299 the eccentric operates to vibrate rails 292 at high frequency thus to compact the carton content and to insure against spillage thereof in transit to the discharge zone.

CARTON SUPPLY UNIT

Structural features of the carton supply mechanism or unit 45 are best shown in FIGS. 4 and 5 reference being also had to FIG. 1. The unit 45 contributes to a controlled advance of the set-up cartons C into an end-to-end line-up in advance of the star wheel unit 47, with the laterally extended cover flaps F of the cartons overlapped in relation to one another, so that in the absence of a reject signal the cartons will be uninterruptedly advanced into the weigher structure in accurately timed relation to the travel of the carton pushers, under the control of star wheel unit 47.

Generally considered, the carton supply unit 45, has an appropriate box-type frame 308 supported at its end adjacent star wheel unit 47 by means of a bracket 309 from the frame post 18. Frame 308 supports elongated parallel restraining rods or rails 310 along both sides of the top thereof, between which the walls of the set-up cartons C are guided. At its opposite end remote from the star wheel unit 47 (FIG. 4) the carton supply frame 308 is sustained by an upright floor post 312. A pair of pulleys 313, 314 are fixed on a horizontal shaft 315 journaled in this end of the frame, the pulley 313 being of larger diameter than the pulley 314. Elongated parallel belts 316, 317 are trained about the respective pulleys 313, 314, for a purpose to be described. The opposite ends of the belts 316, 317 are trained about pulleys 318, 319 on a horizontal shaft journaled in that end of frame 308.

The upper reaches of the belts 316 pass over the upper horizontal wall of a vacuum manifold 320 on frame 308, and in both of the vacuum manifold's end zones the upper manifold has at least one series of longitudinally aligned orifices 324. Air is withdrawn from the vacuum manifold 320 by a vacuum blower 320' appropriately vacuum coupled at its inlet to the side of frame 308 and whose motor and blower base are attached thereon by a plate base extension therefrom.

Thus, as operated at uniform rotative speed, by means to be described, the different diameter pulleys 313 and 314 impart greater and lesser linear speed, respectively, to the parallel belts 316 and 317. With cartons initially held down against the belts by vacuum applied through the orifices 324 at the left of FIGS. 4 and 5, the result is that the cartons C are tilted somewhat in the horizontal plane, so that in being advanced by the belts, their adjacent, laterally projecting flaps F come into overlapped relation to one another, as shown toward the right in FIG. 4. This positions the cartons in a desired, closely spaced end-to-end relation to one another as they accumulate before the star wheel 245 of carton control unit 47.

The belt and pulley drive shaft 315 of the carton supply unit 45 has a large diameter pulley 326 secured thereto at one side of the frame 308, a drive belt 327 being trained about this pulley, and a smaller diameter pulley 328 is journaled intermediate the length of the frame. A further, larger diameter pulley 329 rotating coaxially with sprocket 328 is drivingly connected by a belt 330 with a pulley 331 on the shaft of an electric drive motor 332 appropriately mounted on frame structure 308. Thus, the carton feed belts 316, 317 are driven at their differential speeds independent of driving connection with the weigher mechanism 30, but the infeed supply of cartons C is nevertheless accurately correlated by the star wheel unit 47.

Motor provisions of the carton supply unit 45 are energized through electrical conduit means 322 connected (FIG. 6) to a control console 333 of the unit.

The vacuum orifices 334 at the star wheel and of manifold 320 are for the purpose of holding the carton C snugly downwardly on the continually traveling belts 316, 317, during the time that carton infeed is checked by the star wheel 245 upon a reject signal from certain control contacts of the weigher, as described in the parent application. Hence the carton directly held back by an edge surface 289 of a point 286 of the wheel will be advanced in a positive and controlled manner into the weigher 30 by the edge surface 290 of the next following point of star wheel 245, once the latter has been released for rotation.

It is seen that the invention affords an improved, star wheel-type of carton control operation, whereby an end-to-end series of cartons supplied to a weigher or like mechanism is interrupted in its normal movement in response to the overweight or underweight reject or like signals.

The invention also provides an improved carton supply unit to forward set-up cartons to the star wheel unit, involving a variable speed, dual belt feed-in of the cartons, and the application of vacuum to the latter, at least at a feed-in supply zone and a feed-out zone directly adjacent the star wheel unit, for the purpose of holding the cartons on the belts, as the latter skew the cartons in travel toward the feed-out zone, in a way to overlap the end flaps of the cartons and secure the desired end-to-end contacting engagement thereof.

What is claimed is:

1. A container supply mechanism for material weighing and packaging apparatus characterized by a weigher unit having a series of continuously traveling weighing heads, a weighing receptacle supported by each head for travel, said heads each having means responsive during said travel to an inacceptable weight of weighed material content in the receptacle thereof to initiate a reject signal, and means to discharge said content after initiation or non-initiation of such signal; said mechanism comprising means to supply a continuous series of containers to position to receive the discharged content only in the absence of the signal, a rotatable container control member normally coacting with said supply means, in timed relation to the travel of said weigher heads, in the positioning of containers to receive the discharged receptacle content, and means operated in response to signal and mechanically connected drivingly to said control member to cause the latter to block the supply of a container to position to receive the inacceptable content producing that signal.

2. The mechanism of claim 1, in which said container control member is normally rotatively driven in synchronism with the travel of the weigher heads, and a brake unit operable to halt rotation of said control member and consequent blocking of the container supply, said mechanism including means responsive to a reject signal to operate the brake unit.

3. The mechanism of claim 2, in which said container control member is normally rotatively driven by a releasable clutch unit transmitting rotation to the member, the means operating said brake unit including an electromagnetic unit responsive to the reject signal.

4. A container supply mechanism for material weighing and packaging apparatus characterized by a weigher unit having a series of continuously traveling weighing heads, a weighing receptacle supported by each head for travel, said heads each having means responsive during said travel to an inacceptable weight of weighed material content in the receptacle thereof to initiate a reject signal, and means to discharge said content after initiation or non-initiation of such signal; said mechanism comprising means to supply a continuous series of containers to position to receive the discharged content only in the absence of the signal, a container control member normally coacting with said supply means, in timed relation to the travel of said weigher heads, in the positioning of containers to receive the discharged receptacle content, means operated in response to signal to cause said control member to block the supply of a container to position to receive the inacceptable content producing that signal, said container control member being normally rotatively driven in synchronism with the travel of the weigher heads, and a brake unit operable to halt rotation of said control member, said mechanism including means responsive to a reject signal to operate the brake unit.

5. The mechanism of claim 4, in which said container control member is normally rotatively driven by a releasable clutch unit transmitting rotation to the member, the means operating said brake unit including an electromagnetic unit responsive to the reject signal.

6. A carbon supply mechanism for a material weighing and packaging apparatus characterized by a series of traveling weigher receptacles having means to initiate a reject signal in the event of an inacceptable weight of material weighed thereon in travel; said mechanism comprising a device to supply a series of set up cartons to receive material discharged from the receptacles in the absence of such signal and acting to bring said cartons in direct end-to-end series engagement with one another as thus moved, and a control device operated in response to a reject signal to interrupt movement of the series in said supply direction, said carton supply device including belt means transporting the cartons for movement in a supply direction and acting to bring said cartons in said direct end-to-end series engagement with one another as thus moved, said belt means including a pair of parallel reaches transporting the cartons for movement in a supply direction, said belt reaches being driven at different speeds and acting to bring said cartons in direct end-to-end series engagement with one another as thus moved.

7. The mechanism of claim 6, in which belt reaches advance the cartons over a horizontal surface, said surface having apertures in communication with a source of vacuum, the cartons being held onto the belt reaches by vacuum applied through said apertures.

8. A container supply mechanism for material weighing apparatus characterized by a weigher unit having a series of continuously traveling weighing heads, a weighing receptacle supported by each head for travel, said heads each having means responsive during said travel to an overweight or underweight of weighed material content in the receptacle thereof to initiate a reject signal, and means to discharge said content after initiation or non-initiation of such signal; said mechanism comprising means to supply a continuous series of containers to position to receive the discharged content only in the absence of the overweight or underweight reject signal, a container control member normally coacting with said supply means, in timed relation to the travel of said weigher heads, in the positioning of containers to receive the discharged receptacle content, and means operated in response to said reject signal to cause said control member to block the supply of a container to position to receive the inacceptable content producing that signal.

References Cited

UNITED STATES PATENTS 3,108,647   10/1963   Harmon et al. _____ 177—55 X
3,156,311   11/1964   Olofsson et al. _____ 177—55

RICHARD B. WILKINSON, Primary Examiner

G. H. MILLER, Jr., Assistant Examiner